United States Patent
Tanaka et al.

(10) Patent No.: US 10,211,000 B2
(45) Date of Patent: *Feb. 19, 2019

(54) ELECTRODE MATERIAL FOR ELECTROCHEMICAL CAPACITOR, ELECTRODE COATING SOLUTION FOR ELECTROCHEMICAL CAPACITOR, ELECTRODE FOR ELECTROCHEMICAL CAPACITOR, AND ELECTROCHEMICAL CAPACITOR

(71) Applicant: TORAY INDUSTRIES, INC., Tokyo (JP)

(72) Inventors: Kentaro Tanaka, Otsu (JP); Kosaku Takeuchi, Otsu (JP); Takaaki Mihara, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/511,892

(22) PCT Filed: Sep. 14, 2015

(86) PCT No.: PCT/JP2015/075998
§ 371 (c)(1),
(2) Date: Mar. 16, 2017

(87) PCT Pub. No.: WO2016/043154
PCT Pub. Date: Mar. 24, 2016

(65) Prior Publication Data
US 2017/0323737 A1 Nov. 9, 2017

(30) Foreign Application Priority Data
Sep. 17, 2014 (JP) .................. 2014-188729

(51) Int. Cl.
*H01B 1/04* (2006.01)
*H01M 4/38* (2006.01)
(Continued)

(52) U.S. Cl.
CPC ............. *H01G 11/32* (2013.01); *C01B 32/00* (2017.08); *C01B 32/05* (2017.08); *D01F 9/22* (2013.01);
(Continued)

(58) Field of Classification Search
CPC .. H01B 1/00; H01B 1/04; H01B 1/24; H01M 4/38; C01B 32/00; C01B 32/15; C01B 32/30
See application file for complete search history.

(56) References Cited

U.S. PATENT DOCUMENTS 4,876,631 A 10/1989 Endo
7,091,156 B2 * 8/2006 Hirahara ............... H01G 11/24
361/502
(Continued)

FOREIGN PATENT DOCUMENTS

EP 3165506 A1 5/2017
EP 3171431 A1 5/2017
(Continued)

OTHER PUBLICATIONS

Tang et al "Fabrication of a high-strength hydrogel with an interpenetrating network structure", Colloids and Surfaces A: Physiochem. Eng. Aspects 346 (2009) 91-98. (Year: 2009) (Year: 2009).*
(Continued)

*Primary Examiner* — Mark Kopec
(74) *Attorney, Agent, or Firm* — RatnerPrestia (57) ABSTRACT

The present invention provides an electrode material for an electrochemical capacitor having high surface utilization efficiency, composed of a porous carbon material capable of
(Continued)

further contributing to higher electrostatic capacitance of the electrochemical capacitor and to development of high rate characteristics; the porous carbon material having a co-continuous structural portion in which a carbon skeleton and voids form respective continuous structures, the co-continuous structural portion having a structural period of 0.002 μm to 20 μm.

15 Claims, 1 Drawing Sheet

(51) Int. Cl.

| | | |
|---|---|---|
| *C01B 32/00* | (2017.01) | |
| *H01G 11/00* | (2013.01) | |
| *H01G 11/32* | (2013.01) | |
| *H01G 11/06* | (2013.01) | |
| *H01G 11/24* | (2013.01) | |
| *H01G 11/40* | (2013.01) | |
| *H01G 11/44* | (2013.01) | |
| *D01F 9/22* | (2006.01) | |
| *H01G 11/26* | (2013.01) | |
| *H01G 11/34* | (2013.01) | |
| *C01B 32/05* | (2017.01) | |

(52) U.S. Cl.
CPC ............... *H01B 1/04* (2013.01); *H01G 11/06* (2013.01); *H01G 11/24* (2013.01); *H01G 11/26* (2013.01); *H01G 11/34* (2013.01); *H01G 11/40* (2013.01); *H01G 11/44* (2013.01); *H01M 4/38* (2013.01); *C01P 2002/74* (2013.01); *C01P 2004/03* (2013.01); *C01P 2006/10* (2013.01); *C01P 2006/12* (2013.01); *C01P 2006/14* (2013.01); *C01P 2006/16* (2013.01); *C01P 2006/40* (2013.01); *Y02T 10/7022* (2013.01)

(56) References Cited

U.S. PATENT DOCUMENTS

| | | | |
|---|---|---|---|
| 2005/0260118 A1* | 11/2005 | Lu | ........................ B01D 53/228 423/445 R |
| 2007/0059233 A1 | 3/2007 | Sheem et al. | |
| 2009/0269667 A1* | 10/2009 | Antonietti | .............. H01G 11/34 429/231.4 |
| 2012/0300364 A1 | 11/2012 | Cai et al. | |
| 2013/0084501 A1* | 4/2013 | Wakayama | ......... H01M 4/1397 429/231.8 |
| 2013/0330504 A1* | 12/2013 | Morishita | ................. B32B 3/12 428/116 |
| 2015/0162138 A1 | 6/2015 | Shodai | |
| 2017/0331101 A1* | 11/2017 | Tachibana | ............. H01M 4/505 |

FOREIGN PATENT DOCUMENTS

| | | |
|---|---|---|
| JP | 01204408 A | 8/1989 |
| JP | 2014036113 A | 2/2014 |
| JP | 2014522355 A | 9/2014 |
| WO | WO-2012131628 A1 * 10/2012 | ............ H01M 4/133 |
| WO | 2013070989 A1 | 5/2013 |

OTHER PUBLICATIONS

Han et al "Porous graphite matrix for chemical heat pumps", Carbon vol. 36, No. 12, pp. 1801-1810. (Year: 1998) (Year: 1998).*

Hwang et al "Capacitance control of carbon aerogel electrodes", Journal of Non-Crystalline Solids 347 (2004) 238-245. (Year: 2004).*

Borchardt et al "Toward a molecular design of porous carbon materials", Materials Today, vol. 20, No. 10, Dec. 2017, pp. 593-610. (Year: 2017).*

Zakhidov et al "Carbon structures with three-dimensional periodicity at optical wavelengths", Science vol. 282, Oct. 1998, pp. 897-901. (Year: 1998) (Year: 1998).*

International Search Report and Written Opinion for International Application No. PCT/JP2015/075998, dated Nov. 10, 2015, 6 Pages.

Barrett et al., "The Determination of Pore Volume and Area Distributions in Porous Substances. I. Computations from Nitrogen ISotherms", J. Amer. Chem. Soc., 73, 373, 1951, pp. 373-380.

Extended European Search Report for European Application No. 15 841 206.4, dated Apr. 26, 2018, 10 pages.

* cited by examiner

ELECTRODE MATERIAL FOR ELECTROCHEMICAL CAPACITOR, ELECTRODE COATING SOLUTION FOR ELECTROCHEMICAL CAPACITOR, ELECTRODE FOR ELECTROCHEMICAL CAPACITOR, AND ELECTROCHEMICAL CAPACITOR

CROSS REFERENCE TO RELATED APPLICATIONS

This is the U.S. National Phase application of PCT International Application No. PCT/JP2015/075998, filed Sep. 14, 2015, and claims priority to Japanese Patent Application No. 2014-188729, filed Sep. 17, 2014, the disclosures of each of these applications being incorporated herein by reference in their entireties for all purposes.

FIELD OF THE INVENTION

The present invention relates to an electrode material for an electrochemical capacitor, an electrode coating solution for an electrochemical capacitor, an electrode for an electrochemical capacitor, and an electrochemical capacitor.

BACKGROUND OF THE INVENTION

In recent years, there is a strong need for preventing air pollution due to exhaust gas, promoting the use of fossil fuel alternative energy, and preventing global warming due to carbon dioxide. A technology for electric vehicles, hybrid vehicles or the like is being developed. Further, the market for innovative terminal devices such as electronic devices, in particular, smartphones is remarkably growing. In relation to these technological innovations, an electrochemical capacitor is being developed as a new power storage device for the purpose of drive power assist, recovery and effective use of energy.

The electrochemical capacitor is a power storage device characterized by much higher speed charging and discharging characteristics and higher cycling characteristics than a secondary battery. There are two major types of electrochemical capacitor including an electric double layer capacitor and a lithium ion capacitor. The electric double layer capacitor usually employs an electrode containing activated carbon as a positive electrode and a negative electrode. Physical adsorption and desorption of electrolyte ions to the activated carbon causes charging and discharging. This does not involve a chemical reaction, so that the electric double layer capacitor is less susceptible to deterioration. The electric double layer capacitor is thus characterized by excellent cycling characteristics. On the other hand, the lithium ion capacitor usually employs as a positive electrode an electrode containing the same activated carbon as that used in the electric double layer capacitor, and as a negative electrode the same lithium-occluding carbon material as that used for the negative electrode in a lithium ion battery. Charging and discharging is performed by absorbing and desorbing electrolyte ions at the positive electrode and occluding and releasing lithium ions at the negative electrode.

Conventionally, activated carbon in a particulate form or in a powder form which has been used as an electrode material for an electrochemical capacitor is easily flocculated in the electrode and has limited contact area with an electrolytic solution. Therefore, it has been difficult to provide higher electrostatic capacitance for the electrochemical capacitor. Moreover, flocculation of activated carbon increases flow resistance of the electrolytic solution, which adversely affects the further improvement of the high-speed charging and discharging characteristics of the electrochemical capacitor. Even in the case where the activated carbon has many pores formed on its surface to have a high specific surface area, these pores are not in communication, so that there has been a problem in that the surfaces inside the flocculated activated carbons are not in use. It has been therefore highly desirable to develop a porous carbon material capable of efficiently utilizing its surface.

For example, Patent Document 1 discloses a capacitor having an electrode containing a porous carbon material, in which pores and carbonaceous walls that serve as external walls of the pores are in a three-dimensional network structure.

PATENT DOCUMENT

Patent Document 1: Japanese Patent Laid-open Publication No. 2014-36113

SUMMARY OF THE INVENTION

In the porous carbon material contained in the electrode disclosed in Patent Document 1, however, the pattern of voids is determined depending on the positions of the dispersed template particles. Therefore, the porous structure of the porous carbon material has insufficient unevenness, so that the surface utilization efficiency of the porous carbon material has not been high.

It is an object of the present invention to provide an electrode material for an electrochemical capacitor having high surface utilization efficiency obtained by making the pours structure satisfactorily even, capable of contributing to higher electrostatic capacitance of the electrochemical capacitor and to development of high rate characteristics.

The present invention is an electrode material for an electrochemical capacitor composed of a porous carbon material having a co-continuous structural portion in which a carbon skeleton and voids form respective continuous structures, the co-continuous structural portion having a structural period of 0.002 μm to 20 μm.

The porous carbon material of the present invention has a co-continuous structural portion with a carbon skeleton and voids, and has a high structural evenness. Therefore, it is possible to achieve higher electrostatic capacitance and development of high rate characteristics as an electrode material for an electrochemical capacitor.

DETAILED DESCRIPTION OF EMBODIMENTS OF THE INVENTION

<Porous Carbon Material>
[Co-Continuous Structural Portion]

The electrode material for an electrochemical capacitor (hereinafter sometimes simply referred to as "electrode material") is composed of a porous carbon material. The porous carbon material used as the electrode material for an electrochemical capacitor of the present invention is hereinafter sometimes referred to as "the porous carbon material of the present invention" for convenience. Further, the porous carbon material of the present invention may be used in the same meaning as the electrode material for an electrochemical capacitor of the present invention.

The porous carbon material of the present invention has a co-continuous structural portion in which a carbon skeleton and voids form respective continuous structures. Specifically, when a specimen of the porous carbon material which has been sufficiently cooled, for example, in liquid nitrogen, is cut with tweezers or the like or pulverized with a mortar or the like, and the cut surface or the surface of the specimen in a particulate form is examined with a scanning electron microscope (SEM) or the like, the porous carbon material has a structure in which a carbon skeleton and voids formed in portions other than the skeleton are respectively continuous and entangled is observed, as illustrated in the scanning electron photomicrograph of the porous carbon material of Example 1 shown in FIG. 1.

The electrode material using the porous carbon material of the present invention allows an electrolytic solution to efficiently penetrate into voids in the co-continuous structural portion in electrochemical capacitor applications, to thereby significantly increase a contact area between the electrolytic solution and the electrode material, which can contribute to higher electrostatic capacitance of the electrochemical capacitor. Further, electrolyte ions can efficiently move in the void portions in the co-continuous structural portion, thereby allowing high-speed charging and discharging of the electrochemical capacitor. Moreover, the continuous carbon skeleton enhances electronic conductivity of the electrode material, so that the internal resistance of the electrochemical capacitor can be reduced. In addition, the effect in which the carbon portions support one another to maintain the structural body is produced, and due to the effect, the material has high resistance to deformations such as ones caused by tension, compression, etc., for example, in the production step or in use. Even though the electrode is subjected to pressing in order to reduce contact resistance of the electrode at the time of cell preparation, the co-continuous structural portion remains, which in turn allows the electrolytic solution to be penetrated thereinto with high efficient.

The co-continuous structure is not particularly limited and examples thereof include the form of a lattice and the form of a monolith. In terms of exhibiting the above-mentioned effect, the form of a monolith is preferable. The term "form of a monolith" refers to a configuration in which the carbon skeleton forms a three-dimensional network structure in the co-continuous structure, which is different from the form of an irregular structure such as a structure in which individual particles are flocculated and combined, or conversely a structure formed with voids which have been generated by removing flocculated and combined template particles and with a skeleton around the voids.

The co-continuous structural portion in the porous carbon material of the present invention has a periodic structure. In the present invention, it can be confirmed that the co-continuous structural portion has a periodic structure when the porous carbon material is irradiated with X-rays and the scattered-light-intensity distribution curve thus obtained has a peak value.

The porous carbon material of the present invention has a structural period in the range of 0.002 μm to 20 μm. The structural period thereof can be determined by irradiating the electrode material for an electrochemical capacitor of the present invention with X-rays and calculating the structural period from the scattering angle θ corresponding to the position where the scattered-light-intensity distribution curve has a peak value, using the following equation.

$$L = \frac{\lambda}{2\sin\theta}$$ [Mathematical Formula 1]

Structural Period: L, λ: Wavelength of Incident X-Rays

It should be noted that a large structural period may fail to observe a scattering at a small angle. In such case, the structural period is obtained by an X-ray computerized tomography (X-ray CT). Specifically, a three-dimensional image photographed by an X-ray CT is subjected to Fourier transform to give a two-dimensional spectrum. Subsequently, the circular average of the two-dimensional spectrum is determined to obtain a one-dimensional spectrum. A characteristic wavelength corresponding to the position of the peak top in the one-dimensional spectrum is obtained and a structural period is determined by an inverse of the obtained wavelength.

When the structural period of the co-continuous structural portion is 0.002 μm or more, an electrolytic solution tends to easily enter into the void portion, and flow resistance can also be reduced. Further, the electronic conductivity can be improved through the carbon skeleton. The structural period is preferably 0.01 μm or more, and more preferably 0.1 μm or more. Meanwhile, not more than 20 μm of the structural period achieves higher surface area and properties. The structural period is preferably 10 μm or less, and more preferably 1 μm or less.

Further, when the material has an even continuous structure, flow resistance of the electrolytic solution can be reduced, and in any steps related to production such as a porous carbon material production step, an electrode production step, and a device assembly step, the material may have high resistance to deformations such as ones caused by tension, compression, etc. The evenness of the continuous structure in the porous carbon material of the present invention can be determined by the half-width of the peak of the scattered-light intensity obtained when the porous carbon material of the present invention is irradiated with X-rays. The half-width of the X-ray scattering peak for the porous carbon material of the present invention is preferably 5° or less, more preferably 3° or less, and even more preferably 1° or less. The term "half-width of the peak" herein means the following: The top of the peak is determined as point A, a straight line is drawn in parallel to the axis of ordinates in the graph from point A to the baseline of the spectrum, the intersection point of the straight line with the baseline is determined as point B. At this time, a peak width at a midpoint (point C) of a line segment which connects points A and B is determined as a half-width of the peak. The term "peak width" herein means a width on the straight line which is in parallel to the baseline and passes through point C.

At the time of the analysis of the structural period by X-rays, a portion having no co-continuous structure to be described later does not affect the analysis because the structure period thereof is not within the above range. The structural period determined by calculation of the above equation is thus the structural period of the co-continuous structure forming portion.

The shorter the structural period, the finer the structure and the larger the surface area per unit volume or unit weight. This can enhance the contact efficiency with the electrolytic solution and can particularly contribute to higher electrostatic capacitance. Meanwhile, the longer the structural period, the more the flow resistance of the electrolytic solution can be reduced, so that the electrolyte ions efficiently move in and out, thereby contributing to development of high rate characteristics. Hence, the structural period of the co-continuous structural portion can be suitably adjusted in accordance with the application and use conditions of the electrochemical capacitor.

The co-continuous structural portion preferably has an average porosity of 10 to 80%. The term "average porosity" means a porosity determined by obtaining a precisely formed cross-section of an embedded specimen by the cross-section polisher method (CP method), examining the cross-section at a magnification regulated so as to result in 1±0.1 (nm/pixel) and at a resolution of 700,000 pixels or higher, setting in the resultant image a square examination region for calculation in which each side has 512 pixels, and calculating the average porosity using the following equation, in which A is the area of the examination region and B is the area of the pores.

$$\text{Average porosity}(\%) = B/A \times 100$$

The higher the average porosity thereof, the more the efficiency of filling can be heightened when the material is composited with other materials and the lower the pressure loss when the co-continuous structural portion is used as a channel for the electrolytic solution. Meanwhile, the lower the average porosity thereof, the higher the resistance to compression and bending, and hence the more, the material is advantageous in terms of handleability and use under pressure. In view of these, the average porosity of the co-continuous structural portion is preferably in the range of 15 to 75%, and more preferably in the range of 18 to 70%.

Containing of polyacrylonitrile in the starting material of the porous carbon material is preferable because of high content of nitrogen in the porous carbon material and high wettability of the electrolytic solution at the time of using the material as a capacitor. That is, the carbon skeleton in the porous carbon material of the present invention is preferably derived from polyacrylonitrile. When polyacrylonitrile is contained in the starting material, the porous structure can be formed only by physical phase separation without polymerization reaction, which achieves higher moldability, as well as excellent structure stability and excellent structure dimension control in a wide range. This embodiment is hence preferred. Further, it is also preferable that containing of polyacrylonitrile in the starting material reduces the cost of the electrode material for an electrochemical capacitor.

[Shape of Porous Carbon Material]

The shape of the porous carbon material of the present invention is not particularly limited and examples thereof include a particulate form, a fiber form, a film form, a powder form, a bulk form, a rod form, a flat plate form and a disk form. Of these, the porous carbon material is preferably in the form of a particulate or fiber.

When the porous carbon material is in a particulate form, the conventional electrode production step in which a coating solution containing activated carbons is applied can be simply applied to the process for producing an electrode for an electrochemical capacitor, and even though bending, tension or compression occurs, distortion can be eliminated between particles.

When the porous carbon material has a portion having no co-continuous structure to be described later, the portion having no co-continuous structure accounts for some of each particle. Because of this, the electronic conductivity within the particle can be heightened. In addition, the compressive strength of the particle itself can be heightened, so that, for example, an effect of inhibiting performance deterioration from occurring at high pressures can be expected. Therefore, it is preferable that the portion having no co-continuous structure accounts for some of each particle.

The diameter of the particle is not particularly limited, and can be suitably selected in accordance with applications. The diameter in the range of 10 nm to 10 mm is preferable because the material can be easily handled. In particular, the particle having a diameter of 10 μm or less, when used, for example, as a solid ingredient for constituting a coating solution, gives an exceedingly smooth solution and, hence, this solution can be prevented from causing defects such as coating solution peeling or cracking in steps of application or the like. Meanwhile, the particle having a diameter of 0.1 μm or larger, when used for producing composite materials with resins, can sufficiently exhibit as a filler the effect of improving strength. This material is hence preferred.

The porous carbon material having a fiber form is preferable because of high productivity and high handleability in the electrochemical capacitor production step. In particular, the high handleability results in higher flexibility in the shape of the electrode to be molded and also achieves more densely filling, thereby contributing to space saving of the electrochemical capacitor.

It is also preferable that the porous carbon material having a film form, a flat plate form or a disk form can be used as it is as an electrode for an electrochemical capacitor.

[Pores]

Further, the porous carbon material of the present invention has preferably pores having an average diameter of 0.01 to 10 nm on a surface thereof. The term "surface" means a contact surface with all externals of the porous carbon material including the surface of the carbon skeleton in the co-continuous structural portion of the porous carbon material. The pores can be formed on the surface of the carbon skeleton in the co-continuous structural portion and/or on a portion having substantially no co-continuous structure to be described later. The pores are preferably formed on the surface of the carbon skeleton in the portion having at least co-continuous structure.

Such pores have an average diameter of preferably not less than 0.01 nm, and more preferably not less than 0.1 nm. The pores also have an average diameter of preferably not more than 5 nm, and more preferably not more than 2 nm. When the average diameter of the pores is in the range of 0.01 nm to 10 nm, the function of adsorbing and desorbing electrolyte ions can be enhanced. From the viewpoint of efficient absorption of electrolyte ions or the like, it is preferable that the average pore diameter is suitably adjusted to about 1.1 to 2.0 times the diameter of the electrolyte ion.

Further, the pore volume is preferably not less than 0.1 $cm^3/g$, more preferably not less than 1.0 $cm^3/g$, and even more preferably not less than 1.5 $cm^3/g$. When the pore volume is not less than 0.1 $cm^3/g$, the function of adsorbing/desorbing electrolyte ions is further enhanced. The upper limit thereof is not particularly limited, but when it exceeds 10 $cm^3/g$, the strength of the porous carbon material reduces, and the bulk density thereof is remarkably lowered and, hence, the handleability tends to worsen, which is not preferable.

In the present invention, the average diameter of the pore means a measurement value obtained by either a BJH method or an MP method. That is, when either of the measurement values by the BJH method and the MP method is within the range of 0.01 to 10 nm, it is judged that the porous carbon material has a pore having an average diameter of 0.01 to 10 nm on its surface. The preferable range of the pore diameter is the same as the above-mentioned range. The BJH method and the MP method are widely used as a pore diameter distribution analyzing method, and the average pore diameter can be obtained based on a desorption isotherm which is obtained by adsorbing/desorbing nitrogen to a porous carbon material. The BJH method is a method of analyzing the distribution of pore volume relative to the pore diameter when the pore is assumed to have a cylindrical shape according to the Barrett-Joyner-Halenda standard model. The method may be applied to pores having a diameter of mainly 2 to 200 nm (for details, see J. Amer. Chem. Soc., 73, 373, 1951, etc.). Furthermore, the MP method is a method of obtaining a pore diameter distribution by determining the pore volume based on the external surface area and the thickness of the adsorption layer (equivalent to the radius of the pore because the pore has a cylindrical shape) of each section obtained from variations in the gradient of the tangent line at each point of the adsorption isotherm, and then plotting the thickness of the adsorption layer (for details, see Journal of Colloid and Interface Science, 26, 45, 1968, etc.). The method can be applied to a pore having a diameter of mainly 0.4 to 2 nm. In the present invention, all the results from these methods are rounded off to one decimal place and the values thus obtained are used.

In the porous carbon material of the present invention, the voids in the co-continuous structural portion may have an influence on the pore diameter distribution or the pore volume determined by the BJH or the MP method. That is, these measurement values may be obtained as values of not purely pores alone but values reflecting the presence of voids. Even in such case, it is judged that the measurement values obtained by these methods are the average diameter of pores and the pore volume in the present invention. Further, when the pore volume determined by the MP method is less than 0.05 cm$^3$/g, it is judged that there is no pore formed on the material surface.

It is preferable that the porous carbon material of the present invention has a BET specific surface area of not less than 20 m$^2$/g. The BET specific surface area thereof is more preferably not less than 100 m$^2$/g, even more preferably not less than 500 m$^2$/g, and still more preferably not less than 1000 m$^2$/g. The BET specific surface area of not less than 20 m$^2$/g causes the area which can act to adsorption and desorption of the electrolyte ions to increase, which improves performance as the electrochemical capacitor. The upper limit thereof is not particularly limited, and when the specific surface area exceeds 4500 m$^2$/g, the strength of the porous carbon material reduces, the bulk density thereof is remarkably lowered and, hence, the handleability tends to worsen. The BET specific surface area of the present invention conforms to JIS R 1626 (1996), and an adsorption isotherm is determined by adsorbing and desorbing nitrogen to the porous carbon material, and the determined data can be determined by calculation based on the BET equation.

[Portion Having Substantially No Co-Continuous Structure]

The porous carbon material of the present invention contains a portion having substantially no co-continuous structure (hereinafter sometimes simply referred to as "portion having no co-continuous structure"). This embodiment is hence preferred. The term "portion having substantially no co-continuous structure" means that a portion in which any voids have a size less than the resolution and hence no distinct voids are observed when a cross-section formed by the cross-section polisher method (CP method) is examined at a magnification resulting in 1±0.1 (nm/pixel) is present over an area that is not less than the region of a square in which each side corresponds to three times the structural period L calculated from X-ray analysis as will be described later.

In the portion having no co-continuous structure, the carbon is densely packed, so that the electronic conductivity is high, which can lower the electric resistance. Further, the presence of the portion having no co-continuous structure enables the resistance to, in particular, compressive rupture to be heightened.

The proportion of the portion having no co-continuous structure can be suitably adjusted. The portion having no co-continuous structure preferably accounts for, for example, 5% by volume or more because it is possible to maintain electrical conductivity and thermal conductivity on a high level.

[Surface Utilization Efficiency]

The surface utilization efficiency of the porous carbon material when used as an electrode material for an electrochemical capacitor is evaluated, for example, by a value obtained by dividing an electrostatic capacitance which has been obtained by a charging/discharging test, by the BET specific surface area, that is, an electrostatic capacitance per BET specific surface area. The charging/discharging test will be described later in detail in examples. The larger the electrostatic capacitance per BET specific surface area, the higher the surface utilization efficiency of the porous carbon material, so that charging and discharging become possible at low resistance, which means that the porous carbon material exhibits high performance as the electrode material for an electrochemical capacitor.

<Electrochemical Capacitor>

A preferred embodiment of an electric double layer capacitor, which is an embodiment of the electrochemical capacitor of the present invention, will be described below. A cell of the electric double layer capacitor has a structure in which two electrodes of a positive electrode and a negative electrode are disposed through a separator and are further immersed in an electrolytic solution. The electric double layer capacitor of the present invention contains the porous carbon material of the present invention in the electrode. It is preferable that the electrode further contains a conductive aid, a binder and a current collector. The electrode may contain one or more kinds of porous carbon material other than the porous carbon material of the present invention.

The cell form of the electrochemical capacitor is not limited. Examples thereof include a coin cell, a laminate cell, and a cylindrical cell.

Examples of the conductive aid may include acetylene black, Ketjen black, furnace black, carbon nanotube, fullerene and graphene. These may be used alone or in combination of two or more kinds.

Examples of the binder include a hydrophobic binder and a hydrophilic binder. Examples of the hydrophobic binder may include polytetrafluoroethylene, polyvinylidene fluoride and styrene-butadiene rubber. Examples of the hydrophilic binder may include hydroxymethyl cellulose, carboxymethyl cellulose and polyvinyl alcohol. These binders may be used alone or in combination of two or more kinds. The binder is preferably composited with the porous carbon material of the present invention and the configuration thereof is not particularly limited. Examples of the configuration may include a configuration in which at least a portion of a film is adhered to the porous carbon material, and a configuration in which at least a portion of a fibril binder is adhered to the porous carbon material.

As the current collector, a known material may be used. Examples thereof may include aluminum, stainless steel, copper and nickel. For the purpose of increasing a contact area with the coating solution to reduce contact resistance, it is preferable that the current collector on the side contacting with the coating solution is also etched.

The thickness of the electrode is not particularly limited, and can be suitably changed according to the desired characteristics. The thicker the electrode, the higher the electrical capacitance can be, and the thinner the electrode, the lower the electrode resistance becomes, which enables high-speed charging and discharging. This embodiment is hence preferred. The thickness of the electrode can be arbitrarily designed in the range of 1 μm to 10 mm.

Since the electrode material composed of the porous carbon material of the present invention has a co-continuous structure, the electrode density can be easily controlled by controlling the carbon portion and the void portion. The electrode containing the electrode material of the present invention has an electrode density of preferably 0.3 to 1.0 g/cm$^3$. The electrode having an electrode density of 0.3 g/cm$^3$ or higher is preferable because when used as an electrochemical capacitor, the electrical capacitance per volume increases. The electrode density is more preferably 0.4 g/cm$^3$ or higher. The electrode having an electrode density of 1.0 g/cm$^3$ or less is preferable because when used as an electrochemical capacitor, the electrolytic solution high-efficiently penetrates into holes in the porous carbon material, which in turn achieves higher capacitance or high-speed charging and discharging. The electrode density is more preferably 0.8 g/cm$^3$ or less.

The electrode density in the present invention is a value obtained in the following manner. A stamping jig having a known area is used to stamp into an electrode. The thickness of the stamped electrode is measured, the volume thereof is determined by calculation, and the weight thereof is further measured. Then, the measured weight is divided by the volume to thereby obtain a value of the electrode density. In the case of an electrode having a current collector, the weight and volume of the current collector are not included in the calculation. That is, in the case of such electrode, the electrode density means a density of a mixture layer derived from the coating solution which has fixed on the current collector.

As the electrolytic solution for the electric double layer capacitor, known electrolyte solution can be used and either aqueous electrolyte solution or non-aqueous electrolyte solution may be used. Examples of the aqueous electrolyte solution include aqueous solutions of sulfuric acid, sodium sulfate, sodium hydroxide, potassium hydroxide, ammonium hydroxide, potassium chloride, and potassium carbonate. Examples of the non-aqueous electrolyte solution include a solution containing an electrolyte such as quaternary ammonium salt or quaternary phosphonium salt, and ethers such as diethyl ether, dibutyl ether, ethyleneglycolmonomethylether and ethyleneglycolmonobutylether; amides such as formamide and N-methylformamide; sulfur-containing compounds such as dimethyl sulfoxide and sulfolane; dialkyl ketones such as methyl ethyl ketone; or carbonates such as ethylene carbonate and propylene carbonate.

As the separator, a conventionally known material may be used. A material which is capable of electrically insulating and does not interfere with flowability of ions is preferable. Specifically, a thin separator having high opening ratio is preferable.

A preferred embodiment of a lithium ion capacitor, which is another embodiment of the electrochemical capacitor of the present invention, will be described below. A positive electrode for the lithium ion capacitor of the present invention contains the porous carbon material of the present invention. The preferred embodiment of the positive electrode is the same as the electrode for the above-mentioned electric double layer capacitor. A negative electrode of the capacitor can be produced by applying a coating solution containing an active material, a binder and a conductive aid to the current collector. As the negative active material, any carbon material can be used as long as the carbon material can reversibly adsorb and desorb lithium ions. As the negative electrode, one pre-doped with lithium ions is preferably used. The pre-doping method is not particularly limited. As a preferred embodiment, the positive electrode and the negative electrode are disposed through a separator and are immersed in an electrolytic solution, to thereby produce the lithium ion capacitor of the present invention. The electrolytic solution is not particularly limited, and a non-aqueous organic electrolytic solution having lithium salts dissolved therein is preferable. The organic solvent that may be used is an aprotic organic solvent and is suitably selected according to the solubility of the electrolyte, reactivity with the electrode, viscosity, and operating temperature range.

<Electrochemical Capacitor Applications>

Since the electrochemical capacitor of the present invention has a high electrostatic capacitance and allows high-speed charging and discharging, the capacitor can be exploited for efficient electric power storage, electric power leveling, etc. in various electronic devices or energy devices. The electrochemical capacitor is suitable for, for example, a fuel cell vehicle, a plug-in hybrid vehicle, a hybrid vehicle, an electric vehicle, a mobile phone, a smartphone, an electric train, a copying machine, a composite machine, a personal computer, an airplane, various consumer electronics, business machines, machine tools, an electric bicycle, a motorcycle, a forklift, construction equipment, various equipment such as a crane, and electronic equipment. Moreover, it is suitably used for equipment related to renewable energy such as solar power generation, wind power generation, geothermal generation, and wave power generation, or power supply control station; and further for back-up power sources for hospitals, factories, data centers, etc.

In particular, in a fuel cell vehicle, a plug-in hybrid vehicle, a hybrid vehicle and an electric vehicle (these are referred to collectively as electric vehicle), the electrochemical capacitor of the present invention can instantaneously store electric power generated by a motor at the time of braking, and can supply the stored power when a significant driving force is required such as at startup. Using the electric energy regenerated and recovered by the brake for driving, the electric vehicle may increase fuel economy 5% or higher than conventional ones.

In a mobile phone and a smartphone, the electrochemical capacitor of the present invention is suitably used because it allows high speed charging. Therefore, the utilization of the electrochemical capacitor of the present invention can reduce the time required for charging.

Furthermore, the electrochemical capacitor of the present invention allows electric power leveling at the time of instant overload or voltage drop. As for a mobile phone, a smartphone or the like, in particular, when a GPS function or a wireless communication function is activated, and when a significant electric power is instantaneously required such as use of LED flash, it is difficult for a secondary battery alone to relieve such load. Therefore, the electrochemical capacitor of the present invention enables such phones to become a device which is compact and withstands high load. Due to the effects, these phones can prevent sudden shut down due to voltage drop better than conventional phones and can be a device capable of stable operation.

Further, the electrochemical capacitor of the present invention is also suitably used as a device to be mounted in an electric train by making the most of its characteristics of high electrostatic capacitance and high speed charging. Since an electric train with the electrochemical capacitor of the present invention mounted thereon has low energy loss caused by friction on the movement of the train, regeneration by braking enables the train to run with saved energy. This embodiment is hence preferred. In particular, even though an abrupt change occurs at the power supply from cables such as a voltage drop caused by a lightning strike or the like, the train can stably accelerate and decelerate, which can contribute to safety run. This is hence preferred.

In a copying machine or a composite machine, the electrochemical capacitor of the present invention is suitably used by the following reason. The capacitor charges electric power from a main power source when the machine is not in use and stores the power. Then, when the machine is used, the capacitor discharges to instantaneously warmup the machine, thereby allowing immediate print-out or the like.

Moreover, the electrochemical capacitor of the present invention is preferably combined with a wind power or solar power generation system. In the wind power generation system, the power generation amount significantly varies with time depending on the wind power fluctuations, and a conventional secondary battery cannot follow the large voltage fluctuations, failing to efficiently store electric power. The high-speed charging and discharging characteristics of the electrochemical capacitor of the present invention, however, allow highly efficient storage of electric power. Meanwhile, in the solar power generation system, even in the case where the voltage on the solar cell side drops particularly in cloudy weather or the like, the charged voltage on the electrochemical capacitor side is low, so that electric power can be efficiently stored. This embodiment is hence preferred. In addition, the electric power stored by these power generations is preferably used by suitably charging a secondary battery through an electronic circuit.

<Process for Producing Porous Carbon Material>

The porous carbon material of the present invention can be produced, for example, by a production process including: a step in which 10 to 90% by weight of a carbonizable resin and 90 to 10% by weight of an eliminable resin are brought into a compatibly mixed state to obtain a resin mixture (step 1); a step in which the resin mixture in a compatibly mixed state is caused to undergo phase separation and the separated phases are fixed (step 2); and a step in which the fixed material is carbonized by pyrolysis under heat (step 3).

[Step 1]

Step 1 is a step in which 10 to 90% by weight of a carbonizable resin and 90 to 10% by weight of an eliminable resin are brought into a compatibly mixed state to obtain a resin mixture.

The carbonizable resin is a resin which carbonizes upon pyrolysis and remains as a carbon material. A carbonizable resin having a carbonization yield of 10% or larger, and more preferably 40% or larger. The term "carbonization yield" used herein means the following. When the temperature is increased at 10° C./min under a nitrogen atmosphere, the weight change of the resin is measured by thermogravimetry (TG), and the difference between the weight at room temperature and the weight at 800° C. is divided by the weight at room temperature and the quotient obtained is determined as a carbonization yield.

As the carbonizable resin, both a thermoplastic resin and a thermosetting resin can be used. Examples of the thermoplastic resin include polyphenylene oxide, polyvinyl alcohol, polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. Among these, polyacrylonitrile and phenolic resins are preferable, and polyacrylonitrile is more preferable in terms of cost and productivity. In particular, in the present invention, even polyacrylonitrile can provide a large specific surface area and hence is a preferred embodiment. These resins may be used either alone or in a mixed state.

Specifically, even more preferable is a porous carbon material produced by a production process of a porous carbon material including: a step in which 10 to 90% by weight of a carbonizable resin containing polyacrylonitrile and 90 to 10% by weight of an eliminable resin are brought into a compatibly mixed state to obtain a resin mixture (step 1); a step in which the resin mixture in a compatibly mixed state is caused to undergo phase separation and the separated phases are fixed (step 2); and a step in which the fixed material is carbonized by pyrolysis under heat (step 3).

Meanwhile, the eliminable resin is a resin to be removed after the step 2 to be described later, and preferably a resin which can be removed in at least any of the following stages: simultaneously with a treatment for imparting infusibility; after the treatment for imparting infusibility; and simultaneously with the pyrolysis. As the eliminable resin, a resin having a carbonization yield of less than 10% is preferable.

The removal rate of the eliminable resin is preferably 80% by weight or more, and more preferably 90% by weight or more at the time of finally becoming a porous carbon material. Methods for removing the eliminable resin are not particularly limited. Suitable methods include: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed.

As the method in which the resin is chemically removed, a method in which the resin is hydrolyzed using an acid or an alkali is preferred from the standpoints of economic efficiency and handleability. Examples of resins which are susceptible to hydrolysis by acids or alkalis include polyesters, polycarbonates, and polyamides.

Preferred examples of the method in which the eliminable resin is removed by a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by a solvent include polyolefins such as polyethylene, polypropylene, and polystyrene, acrylic resins, methacrylic resins, polyvinylpyrrolidone, aliphatic polyesters, and polycarbonates. Of these, amorphous resins are preferred from the standpoint of solubility in the solvent. Examples of the amorphous resin include polystyrene, methacrylic resins, polycarbonates, and polyvinylpyrrolidone.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferable that the eliminable resin is, among those resins, a resin that disappears in the step 3, which will be described later, through thermal decomposition when the carbonizable resin is carbonized by pyrolysis. It is preferable that the eliminable resin is a resin that does not undergo a large chemical change when the carbonizable resin is subjected to the treatment for imparting infusibility, which will be described later, and that, after pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In the step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by adding a solvent or the like thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a nonsolvent.

The solvent to be added is not particularly limited. However, preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties. It is therefore preferable that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, most preferably 2.0 or less.

Specific examples of combinations of carbonizable resin and eliminable resin to be brought into a compatibly mixed state, in the case where the system contains no solvent, include polyphenylene oxide/polystyrene, polyphenylene oxide/styrene-acrylonitrile copolymer, wholly aromatic polyester/polyethylene terephthalate, wholly aromatic polyester/polyethylene naphthalate, and wholly aromatic polyester/polycarbonate. Specific examples of the combinations, in the case where the system contains a solvent, include polyacrylonitrile/polyvinyl alcohol, polyacrylonitrile/polyvinylphenol, polyacrylonitrile/polyvinylpyrrolidone, polyacrylonitrile/polylactic acid, polyvinyl alcohol/vinyl acetate-vinyl alcohol copolymer, polyvinyl alcohol/polyethylene glycol, polyvinyl alcohol/polypropylene glycol, and polyvinyl alcohol/starch.

Methods for mixing the carbonizable resin with the eliminable resin are not limited, and various known mixing techniques can be employed so long as even mixing is possible therewith. Examples thereof include a rotary mixer having stirring blades and a kneading extruder with screws.

It is a preferred embodiment that the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, and the temperature is preferably 400° C. or lower from the standpoint of preventing resin deterioration due to thermal degradation, thereby obtaining a precursor for the porous carbon material, which has excellent quality.

In the step 1, 10 to 90% by weight of the carbonizable resin is mixed with 90 to 10% by weight of the eliminable resin. In the case where the proportions of the carbonizable resin and eliminable resin are within those ranges, an optimal void size and an optimal porosity can be arbitrarily designed. Those proportion ranges are hence preferred. When the proportion of the carbonizable resin is 10% by weight or larger, it is possible to retain mechanical strength in the carbonized material, and to improve yield, so that the proportions are preferred. Meanwhile, when the proportion of the carbonizable material is 90% by weight or less, the eliminable resin can efficiently form voids, so that the proportions are preferred.

A mixing ratio between the carbonizable resin and the eliminable resin can be arbitrarily selected within the range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to the so-called partial composition by increasing or reducing the amount of the carbonizable resin.

It is also a preferred embodiment that a solvent is added when the carbonizable resin and the eliminable resin are mixed with each other. The addition of a solvent not only lowers the viscosity of the carbonizable resin and eliminable resin to facilitate molding but also makes the carbonizable resin and the eliminable resin easy to bring into a compatibly mixed state. The solvent referred to herein is not also particularly limited, and any solvent which is liquid at ordinary temperature and in which at least one of the carbonizable resin and the eliminable resin is soluble or swellable may be used. It is a more preferred embodiment that a solvent in which both the carbonizable resin and the eliminable resin dissolve is used because the compatibility between both resins can be improved.

It is preferable that the amount of the solvent to be added is 20% by weight or larger based on the total weight of the carbonizable resin and the eliminable resin, from the standpoints of improving the compatibility between the carbonizable resin and the eliminable resin and lowering the viscosity thereof to improve the flowability. Meanwhile, from the standpoint of the cost of the recovery and recycling of the solvent, the amount of the solvent to be added is preferably 90% by weight or less based on the total weight of the carbonizable resin and the eliminable resin.

[Step 2]

The step 2 is a step in which the resin mixture that has been brought into a compatibly mixed state in the step 1 is caused to undergo phase separation to form a microstructure and the separated phases are fixed.

The phase separation of the carbonizable resin and eliminable resin that have been mixed together can be induced by various physical and chemical techniques. Examples thereof include: a heat-induction phase separation method in which phase separation is induced by a temperature change; a nonsolvent-induction phase separation method in which phase separation is induced by adding a nonsolvent; a flow-induction phase separation method, an orientation-induction phase separation, an electric field-induction phase separation, a magnetic field-induction phase separation, and a compression-induction phase separation in which phase separation is induced by a physical field; and a reaction-induction phase separation method in which phase separation is induced using a chemical reaction. Among these, a method in which phase separation is accompanied with no chemical reaction, such as a heat-induction phase separation method and a nonsolvent-induction phase separation method is preferable from the standpoint of easily producing the porous carbon material of the present invention.

These phase separation methods can be used alone or in combination thereof. Specific examples of methods in the case of using a combination include: a method in which the mixture is passed through a coagulating bath to cause nonsolvent-induced phase separation and the mixture is then heated to cause heat-induced phase separation; a method in which nonsolvent-induced phase separation and heat-induced phase separation are simultaneously caused by controlling the temperature of a coagulating bath; and a method in which the material ejected from a spinning nozzle is cooled to cause heat-induced phase separation and is then brought into contact with a nonsolvent.

The expression "phase separation is accompanied with no chemical reaction" herein means that either of the carbonizable resin and eliminable resin which have been mixed undergoes no change in primary structure before and after the mixing. The term "primary structure" means the chemical structure which constitutes the carbonizable resin or the eliminable resin. In the case where the phase separation is accompanied with no chemical reaction such as polymerization, change in characteristics such as considerable increase in elastic modulus is suppressed and hence, a structure body of any shape such as a fiber or film shape can be easily molded. As the production process of the present invention, the phase separation accompanied with chemical reaction is excluded from the viewpoint of achieving stable production at low cost. As described above, the porous carbon material of the present invention is not limited to the production process of the present invention.

[Removal of Eliminable Resin]

It is preferable that the resin mixture in which a microstructure resulting from the phase separation has been fixed in the step 2, is subjected to removal of the eliminable resin before being subjected to the carbonization step (step 3) or simultaneously with the carbonization step, or both. Methods for the removal of the eliminable resin are not particularly limited, and any method may be used so long as the eliminable resin can be removed thereby. Specifically, suitable methods include: a method in which the eliminable resin is chemically decomposed and lowered in molecular weight using an acid, alkali, or enzyme and is removed thereby; a method in which the eliminable resin is dissolved away with a solvent capable of dissolving the eliminable resin; and a method in which the eliminable resin is decomposed using radiation or heat, such as electron beams, gamma rays, ultraviolet rays, or infrared rays, to thereby remove the eliminable resin.

Especially, in the case where the eliminable resin can be removed by thermal decomposition, a heat treatment may be conducted beforehand at such a temperature that at least 80% by weight of the eliminable resin disappears, or the eliminable resin may be gasified by thermal decomposition and then removed in the carbonization step (step 3) or in the treatment for imparting infusibility which will be described later. It is a more suitable embodiment that the method is selected in which the eliminable resin is gasified by thermal decomposition and then removed simultaneously with heat treatment in the carbonization step (step 3) or in the treatment for imparting infusibility which will be described later, from the standpoint of reducing the number of steps to heighten the productivity.

[Treatment for Imparting Infusibility]

It is preferable that a precursor material, which is the resin mixture in which a microstructure resulting from the phase separation has been fixed in the step 2 is subjected to a treatment for imparting infusibility before being subjected to the carbonization step (step 3). Methods for the treatment for imparting infusibility are not particularly limited, and known methods can be used. Specific examples of the methods include: a method in which the resin mixture is heated in the presence of oxygen to thereby cause oxidative crosslinking; a method in which the resin mixture is irradiated with high-energy rays such as electron beams or gamma rays to form a crosslinked structure; and a method in which a substance having a reactive group is immersed or mixed to form a crosslinked structure. Of these, the method in which the resin mixture is heated in the presence of oxygen to thereby cause oxidative crosslinking is preferred because the process is simple and the production cost can be reduced. These techniques can be used alone or in combination thereof, and the techniques may be used either simultaneously or separately.

The heating temperature in the method in which the resin mixture is heated in the presence of oxygen to thereby cause oxidative crosslinking is preferably a temperature of 150° C. or higher from the standpoint of causing the crosslinking reaction to proceed efficiently, but is preferably a temperature of 350° C. or lower from the standpoint of preventing the yield from being impaired by a weight loss due to the thermal decomposition, combustion, etc. of the carbonizable resin.

There are no particular limitations on oxygen concentration during the treatment. However, a gas having an oxygen concentration of 18% or higher is preferably supplied, in particular, air is supplied as it is, because use of such a gas makes it possible to reduce the production cost. Methods for supplying the gas are not particularly limited. Examples thereof include a method in which air is supplied as it is to the heating device and a method in which pure oxygen is supplied to the heating device using a bomb or the like.

Examples of the method in which the resin mixture is irradiated with high-energy rays such as electron beams or gamma rays to forma crosslinked structure include a method in which a commercially available electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1,000 kGy or less from the standpoint of preventing the material strength from being reduced by a decrease in molecular weight due to cleavage of the main chain.

Examples of the method in which a substance having a reactive group is immersed or mixed to forma crosslinked structure include: a method in which a low-molecular-weight compound having a reactive group is immersed into the resin mixture, followed by heating or irradiating with high-energy rays to cause a crosslinking reaction to proceed; and a method in which a low-molecular-weight compound having a reactive group is mixed beforehand, followed by heating or irradiating with high-energy rays to cause a crosslinking reaction to proceed.

A suitable method is to conduct a removal of eliminable resin simultaneously with the treatment for imparting infusibility, because the benefit of a cost reduction due to the reduction in the number of steps can be expected.

[Step 3]

The step 3 is a step in which the resin mixture in which a microstructure resulting from the phase separation has been fixed in the step 2, or the remaining portion composed of the carbonizable resin in the case where the eliminable resin has already been removed is pyrolyzed and then carbonized to obtain a carbonized material.

It is preferable that the pyrolysis is conducted by heating the resin mixture or the remaining portion in an inert gas atmosphere to 600° C. or higher. The term "inert gas" herein means a gas which is chemically inert during the heating. Specific examples thereof include helium, neon, nitrogen, argon, krypton, xenon, and carbon dioxide. It is preferable from the standpoint of economical efficiency that nitrogen or argon is used among these. In the case where the carbonization temperature is set to 1,500° C. or higher, it is preferred to use argon from the standpoint of inhibiting the formation of nitrides.

The flow rate of the inert gas is not limited so long as the oxygen concentration within the heating device can be sufficiently lowered, and it is preferred to suitably select an optimal value in accordance with the size of the heating device, amount of the feed material to be supplied, heating temperature, etc. There is no particular upper limit on the flow rate. It is preferable that it is suitably set in accordance with a temperature distribution or the design of the heating device, from the standpoints of economical efficiency and of reducing temperature differences within the heating device. Furthermore, in the case where the gases which generate during the carbonization can be sufficiently discharged from the system, a porous carbon material having excellent quality can be obtained. This embodiment is hence more preferred. It is, therefore, preferred to determine the flow rate of the inert gas so that the concentration of the generated gases in the system is 3000 ppm or less.

There is no upper limit on the temperature at which the resin mixture or the remaining portion is heated. However, temperatures not higher than 3,000° C. are preferred from the standpoint of economical efficiency because the equipment requires no special processing. The temperature is preferably 1500° C. or lower, and more preferably 1000° C. or lower in order to increase the BET specific surface area.

With respect to heating methods in the case where the carbonization treatment is continuously performed, a method in which the material is continuously fed to and taken out from the heating device kept at a constant temperature, using rollers, conveyor, or the like is preferred because the productivity can be heightened.

Meanwhile, in the case where a batch treatment is conducted in a heating device, there is no particular lower limit on the heating rate and cooling rate. However, rates of 1° C./min or higher are preferred because the time period required for the heating and cooling can be shortened to thereby heighten the productivity. Further, there is no particular upper limit on the heating rate and cooling rate, and it is preferred to employ as the upper limit on the heating rate and cooling rate a rate which is lower than the thermal shock resistance of the material that constitutes the heating device.

[Activation Treatment]

The carbonized material obtained in the step 3 is further subjected to activation treatment, so that pores can be formed on the surfaces thereof. The activation method is not particularly limited and a gas activation method, a chemical activation method or the like may be used. The gas activation method is a method in which pores are formed by using oxygen, water vapor, carbon dioxide, air or the like as an activator, heating a carbonized material at a temperature of 400 to 1500° C., preferably 500 to 900° C. for several minutes to several hours. Further, the chemical activation method is a method in which using one or more kinds of chemicals selected from zinc chloride, ferric chloride, calcium phosphate, calcium hydroxide, potassium hydroxide, magnesium carbonate, sodium carbonate, potassium carbonate, sulfuric acid, sodium sulfate, potassium sulfate and the like, heat treatment is performed for several minutes to several hours. If desired, the heated product is washed with water, hydrochloric acid or the like, the pH thereof is then adjusted, and the obtained product is dried.

In general, there are tendencies that the BET specific surface area increases and the pore diameter is enlarged due to further progression of activation and increase of the activator mixing amount. The mixing amount of the activator is preferably 0.5 parts by weight or more, more preferably 1.0 part by weight or more, and even more preferably 4 parts by weight or more, relative to the target carbon material. The upper limit of the mixing amount of the activator is not particularly limited and the amount is generally 10 parts by weight or less. The chemical activation method tends to enlarge the pore diameter more than the gas activation method.

In the present invention, a chemical activation method is preferably adopted because the method enables the pore diameter to be enlarged and the BET specific surface area to increase. Especially, a chemical activation method with an alkaline chemical such as calcium hydroxide, potassium hydroxide and potassium carbonate is preferably adopted.

In the case of activation with an alkaline chemical, the amount of the acid functional group tends to increase, which may not be preferable depending on the applications. At this time, the carbon material is preferably subjected to heat treatment under an atmosphere of nitrogen, thereby allowing to reduce the amount thereof.

[Pulverization Treatment]

The carbonized material obtained by carbonization in the step 3, or the porous carbon material obtained by pulverizing the porous carbon material which has been arbitrarily subjected to activation treatment, into a particulate form is preferably used as the electrode material of the present invention. Examples of the pulverization treatment method include a ball mill, a bead mill and a jet mill. Although the pulverization treatment may be continuous or batchwise, a continuous treatment is preferred from the standpoint of production efficiency. The filling material to be filled into the ball mill is suitably selected. It is preferable that a material based on a metal oxide, such as alumina, zirconia, or titania, or a material obtained by coating stainless steel, iron, or the like as cores with a nylon, polyolefin, fluorinated polyolefin, or the like is used for applications where inclusion of a metallic material is undesirable. For other applications, a metal such as stainless steel, nickel, or iron can be suitably used.

It is also a preferred embodiment from the standpoint of heightening the efficiency of pulverization that a pulverization aid is used during the pulverization. The pulverization aid is selected arbitrarily from among water, alcohols, glycols, ketones, etc. Ethanol and methanol are preferred alcohols from the standpoints of ease of availability and cost. In the case of using a glycol, ethylene glycol, diethylene glycol, propylene glycol, or the like is preferable. In the case of using a ketone, acetone, ethyl methyl ketone, diethyl ketone, or the like is preferable.

The carbonized material which has undergone the pulverization treatment is classified to give a material which is even in particle size, and hence makes it possible to stabilize the step of coating solution application. Consequently, it can be expected to heighten the production efficiency to attain a cost reduction. With respect to particle size, it is preferred to suitably select the size in accordance with applications of the pulverized carbonized material.

[Production Process of Electrochemical Capacitor]

The electrochemical capacitor of the present invention can be produced by the method identical to that of the conventional electrochemical capacitors, except that an electrode including the porous carbon material of the present invention is used. A preferred embodiment thereof will be described below.

First, a method for producing an electrode will be described. For example, in the case where the porous carbon material of the present invention is in the form of a film, the material can be utilized as an electrode as it is. At this time, it is preferable not to use a current collector from the standpoint of miniaturization of the electrochemical capacitor.

Further, for example, in the case where the porous, carbon material of the present invention is in a particulate form, a coating solution is prepared and then applied to a current collector to thereby produce an electrode. This process is hence preferred. At this time, it is possible to produce the coating solution by a dry method or a wet method. Each of the methods will be described in detail below.

When the coating solution is produced by a dry method, the method of mixing the porous carbon material of the present invention and other material is not particularly limited. From the viewpoints of ease of heating or production efficiency, a method of kneading with a biaxial extruder is preferable. The term "other material" herein means a binder, a conductive aid or the like. These materials may be suitably used as required. The dry method also allows a solvent to be contained. From the viewpoint of improving mixing effect by shearing, the other material is preferably less than 30% by weight relative to the total amount of the coating solution. After mixing, the mixture is preferably molded in a film form while heating.

Next, as the method of producing the coating solution by a wet method, a method of mixing the porous carbon material of the present invention, a solvent, and other material to thereby prepare an electrode coating solution in a slurry form may be used. The term "other material" herein means a binder, a conductive aid or the like. These materials may be suitably used as required. The mixing procedure is not limited, and a method of simultaneously charging all the materials; a method of mixing a solid ingredient beforehand; or a method of mixing an ingredient having solubility to a solvent and preparing a solution beforehand may be used. The mixing method is not particularly limited, and from the viewpoint of mixing efficiency, an airtight rotation type stirrer is preferably used. The coating method of the electrode coating solution is not particularly limited, and examples thereof include a doctor blade method, dip method, reverse roll method, direct roll method, gravure method, extrusion method, and brush method.

The assembly method of the electric double layer capacitor cell according to the present invention is not particularly limited and a general assembly method is used. Preferably, an electrochemical capacitor electrode composed of the porous carbon material of the present invention and an electrolytic solution are put in a cell container and the container is airtightly sealed to thereby produce the cell. The electrochemical capacitor electrode is suitably made into a size corresponding to the cell container by a method such as stamping and cutting out, and the resulting electrode is put into the cell container by winding up, laminating, or folding as required. The cell container is filled with an electrolytic solution and then sealed. The electrochemical capacitor is hence produced. Alternatively, an electrochemical capacitor which has been immersed in the electrolytic solution in advance may be accommodated in the cell container. At the time of assembly, a separator, a spacer, or a gasket is used as required. This embodiment is also hence preferred.

For the viewpoint of production efficiency, it is preferable that some or all of the steps related to the production of the electrochemical capacitor are continuously conducted.

The electrode may be pressed first and then incorporated in the cell. Pressing of the electrode causes the porous carbon materials in the electrode and/or the porous carbon material and a member other than the electrode (e.g., a current collector) to be press-contacted to each other to thereby forma conductive path. This provides an advantage of reducing the resistance. On the contrary, no pressing of the electrode provides an advantage in that many voids where the electrolytic solution flows in the porous carbon material are present in the electrode. In comprehensive consideration of these advantages, whether the electrode is pressed or not may be determined. Since the porous carbon material of the present invention has communicating pores due to the co-continuous structure, some of the voids where the electrolytic solution flows are maintained even after pressing. Therefore, depending on the press conditions or applications of the electrochemical capacitor, pressing allows a conductive path to be formed and also a portion where the electrolytic solution flows to be maintained. Therefore, pressing is preferable. The pressing step may be incorporated in any part of all the steps related to the production of the electrochemical capacitor. Further, pressing may be performed in a state where a member other than the electrode (e.g., a separator) is being laminated on the electrode.

EXAMPLES

Preferred examples of the present invention will be described below, but the following description should not limit the present invention at all.
<Evaluation Method>
[Presence/Absence of Co-Continuous Structure]
The porous carbon material was pulverized with a mortar, and the surfaces of the resulting powders were examined with a scanning electron microscope. At this time, the presence or absence of the co-continuous structure was judged by the presence or absence of a portion observed as a structure in which a carbon skeleton and voids, which had been formed as a portion other than the carbon skeleton, were respectively continuous and entangled on the surfaces.
[Structural Period of Continuous Structure Portion]
A porous carbon material was sandwiched between specimen plates, and the position of a CuKα line source and the positions of the specimen and a two-dimensional detector were regulated so that information on scattering angles less than 10 degrees was obtained from the X-ray source obtained from the CuKα line source. From the image data (luminance information) obtained from the two-dimensional detector, the data on the central portion which had been affected by a beam stopper were excluded. Radius vectors from the beam center were set, and the values of luminance for the range of 360° at angular intervals of 1° were summed up to obtain a scattered-light-intensity distribution curve. Whether the continuous structure portion had a structural period or not was confirmed by whether the curve obtained had a peak or not. When the curve had a peak value, from the scattering angle 2θ corresponding to the position of the peak in the curve, the structural period of the continuous structure portion was obtained using the following equation.

$$L = \frac{\lambda}{2\sin\theta}$$ [Mathematical Formula 2]

Structural Period: L, λ: Wavelength of Incident X-Rays
[Average Porosity]
A specimen was embedded in a resin, and a cross-section of the porous carbon material was thereafter exposed with a razor blade or the like. Using SM-09010, manufactured by JEOL Ltd., the specimen surface was irradiated with argon ion beams at an accelerating voltage of 5.5 kV to etch the surface. A central part of the resultant cross-section of the porous carbon material obtained was examined with a scanning secondary-electron microscope at a magnification regulated so as to result in 1±0.1 (nm/pixel) and at a resolution of 700,000 pixels or higher, and a square examination region for calculation in which each side had 512 pixels was set in the resulting image. The average porosity was calculated using the following equation, in which A was the area of the examination region and B was the area of the pores or eliminable resin portion.

Average porosity(%)=$B/A$×100

[BET Specific Surface Area, Pore Diameter]
A specimen was subjected to degassing under reduced pressure at 300° C. for about 5 hours. Thereafter, using BELSORP-18PLUS-HT manufactured by BELL Japan, Inc., nitrogen adsorption/desorption was measured by a multipoint method with liquid nitrogen at a temperature of 77K. The surface area was determined by the BET method, and pore distribution analysis (pore diameter, pore volume) was conducted by the MP or the BJH method.
[Surface Utilization Efficiency of Porous Carbon Material]
The surface utilization efficiency of the porous carbon material when used as an electrode material for an electrochemical capacitor was evaluated by a value obtained by dividing an electrostatic capacitance which had been obtained by a charging/discharging test, by the BET specific surface area, that is, an electrostatic capacitance per BET specific surface area.

Example 1

Into a separable flask were introduced 70 g of polyacrylonitrile (Mw, 150,000, carbon yield 58%) manufactured by Polysciences, Inc., 70 g of polyvinylpyrrolidone (Mw, 40,000) manufactured by Sigma Aldrich, and 400 g of dimethyl sulfoxide (DMSO) manufactured by WAKENYAKU CO. LTD., as a solvent. The contents were heated at 150° C. for 3 hours with stirring and refluxing, thereby preparing an even and transparent solution. In this solution, the concentration of the polyacrylonitrile and the concentration of the polyvinylpyrrolidone were 13% by weight each.

The DMSO solution obtained was cooled to 25° C. and then ejected at a rate of 3 mL/min from a one-orifice nozzle having an orifice diameter of 0.6 mm, and the extrudate was led into a pure-water coagulating bath kept at 20° C., subsequently taken off at a rate of 5 m/min, and accumulated in a vat to thereby obtain raw fibers. In this operation, the air gap was set at 5 mm, and the length of immersion in the coagulating bath was 15 cm. The raw fibers obtained were translucent and had undergone phase separation. The raw fibers obtained were dried for 1 hour in a circulating dryer kept at 25° C., thereby removing the water present on the fiber surface. Thereafter, vacuum drying was conducted at 25° C. for 5 hours to obtain dried raw fibers as a precursor material.

The raw fibers as a precursor material were thereafter introduced into an electric furnace kept at 240° C. and heated in an oxygen atmosphere for 1 hour, thereby performing a treatment for imparting infusibility. The raw fibers which had undergone the treatment for imparting infusibility changed to black in color. The infusible raw fibers obtained were subjected to a carbonization treatment under the conditions of a nitrogen flow rate of 1 L/min, heating rate of 10° C./min, maximum temperature of 850° C., and holding time of 1 minute, thereby obtaining carbon fibers having a co-continuous structure. The diameter of the fiber was 150 μm.

Figure 1:
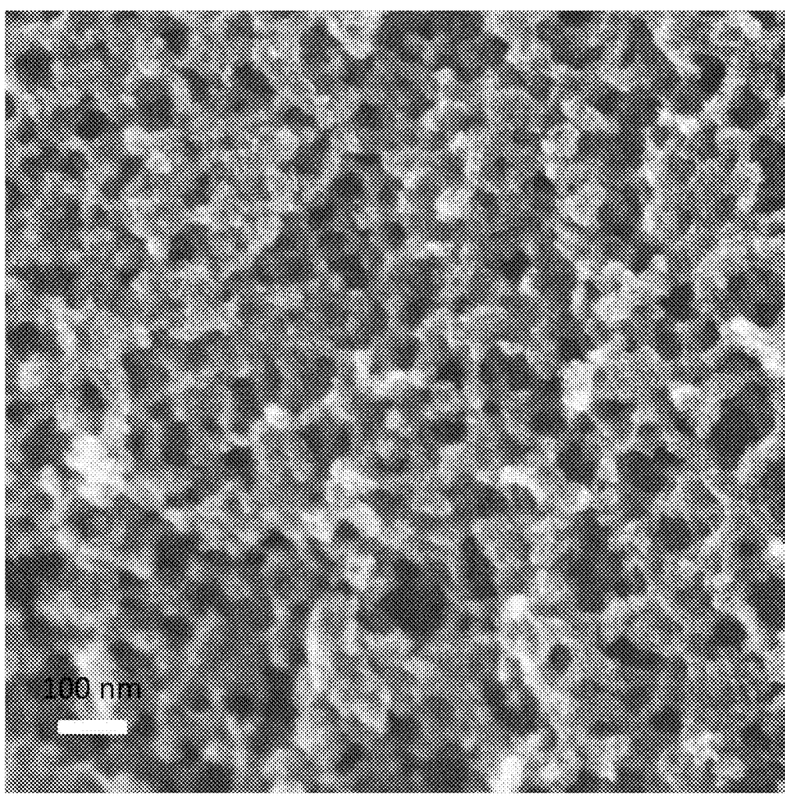
FIG. 1 illustrates a scanning electron photomicrograph of an electrode material for an electrochemical capacitor of Example 1.

Next, the carbon fibers were pulverized using a ball mill. Thereafter, potassium hydroxide in an amount 4 times as much as the carbonized material was mixed with the pulverized carbon fibers as activation treatment, the mixture was then introduced into a rotary kiln, and the temperature was increased to 800° C. under a flow of nitrogen. The mixture was subjected to an activation treatment for 1 hour and 30 minutes, and the temperature was thereafter decreased. Using water and dilute hydrochloric acid, the resulting mixture was washed until the pH became about 7. As shown in FIG. 1, an even co-continuous structure was formed in the obtained porous carbon material in a particulate form. The average porosity in the co-continuous structural portion was 45% and the structural period was 73 nm. Further, the carbon fibers had a structure which contained a portion having no co-continuous structure in a portion of the particles. The BET specific surface area was 2380 $m^2/g$, the average diameter of the pore by the MP method was 0.6 nm, the average diameter of the pore by the BJH method was 3.3 nm, and the pore volume by the MP method was 1.9 $cm^3/g$. The results are summarized in Table 1.

Added were 80 parts by weight of the obtained porous carbon material, 10 parts by weight of acetylene black as a conductive aid, 10 parts by weight of polyvinylidene fluoride as a binder, and 400 parts by weight of N-methyl-2-pyrrolidone as a solvent, and were mixed with a planetary mixer to give an electrode coating solution. The electrode coating solution was applied to an aluminum foil (thickness of 18 μm) using an applicator (300 μm), the applied foil was dried at 80° C. for 30 minutes. The dried foil was then stamped into a piece having a diameter of 16 mm to give an electrode. The electrode density was 0.43 $g/cm^3$. The electrode was vacuum dried at 120° C. for 12 hours in a glass container connected between a vacuum pump and a joint with a glass cock. The cock was then closed, the tube was detached while maintaining the vacuum state, and the electrode was put in a glove box as is.

Using the produced electrode as a positive electrode and a negative electrode, FC25CH1 (manufactured by Toray Battery Separator Film Co., Ltd.) which had been cut out in a diameter of 16 mm was used as a separator and tetraethyl ammonium tetrafluoroborate/propylene carbonate (1M) was used as an electrolytic solution, to produce a 2042 type coin cell. Using this coin cell, a charging/discharging test was carried out. A constant-current charging/discharging was conducted at a current value of 1 mA in the voltage range of 0 to 2.5 V. Four cycles of charge and discharge were performed, and an electrostatic capacitance was determined by calculation from the discharge curve at the fourth cycle. The electrostatic capacitance was 20.2 F/g, and the electrostatic capacitance per BET specific surface area was 0.85 $\mu F/cm^2$. The results are summarized in Table 1.

Example 2

The procedures before the steps of carbonization treatment and pulverization were performed in the same manner as in Example 1, but the steps subsequent to the activation treatment were not performed, so that a porous carbon material in a particulate form was obtained. A co-continuous structure was formed in the porous carbon material thus obtained. The average porosity in the co-continuous structural portion was 45% and the structural period was 73 nm. Further, the porous carbon material had a structure which contained a portion having no co-continuous structure in a portion of the particles. The BET specific surface area was 39 $m^2/g$, the average diameter of the pore by the BJH method was 12.1 nm, and pores by the MP method were not confirmed.

The electrode production and the charging/discharging test were carried out in the same manner as in Example 1. As a result, the electrode density was 0.68 $g/cm^3$, the electrostatic capacitance was 0.4 F/g, and the electrostatic capacitance per BET specific surface area was 1.03 $\mu F/cm^2$. The results are summarized in Table 1.

Example 3

To 100 g of a methanol solution containing 45% by weight of phenol resol (grade: PL2211) manufactured by Gunei Chemical Industry Co., Ltd. were added 25 g of polymethyl methacrylate (PMMA) manufactured by Wako Pure Chemical Industries, Ltd. and 100 g of acetone, and the added mixture was stirred to dissolve the PMMA.

The prepared solution was poured into a polytetrafluoroethylene dish and then dried at room temperature for 4 days. Further, the solution thus dried was kept in a vacuum oven at 23° C. for 3 days to remove the solvent. Thereafter, the temperature in the oven was set to 40° C., and the drying was continued for 2 days in order to completely remove the solvent. The resulting amber solid sample was molded with a 37 t press molding machine so that a flat plate having a size of 50 mm×50 mm×5 mm (length×width×height) was subjected to a molding pressure of 10 kgf/cm2 at a temperature of 180° C. for 20 minutes. This sample was washed by stirring in acetone for 2 days to thereby completely remove the PMMA component.

Thereafter, the resulting sample was subjected to carbonization treatment under the conditions of a nitrogen flow rate of 1 L/min, a heating rate of 10° C./min, a maximum temperature of 700° C., and a holding time of 1 hour, thereby obtaining a porous carbon material.

Thereafter, pulverization and activation were performed in the same manner as in Example 1, to thereby obtain a porous carbon material in a particulate form. A co-continuous structure was formed in the porous carbon material in a particulate form. The average porosity in the co-continuous structural portion was 42% and the structural period was 91 nm. Further, the porous carbon material had a structure which contained a portion having no co-continuous structure in a portion of the particles. The BET specific surface area was 1231 $m^2/g$, the average diameter of the pore by the MP method was 0.4 nm, the average diameter of the pore by the BJH method was 20.1 nm, and the pore volume was 1.2 $cm^3/g$.

The electrode production and the charging/discharging test were carried out in the same manner as in Example 1. As a result, the electrode density was 0.46 $g/cm^3$, the electrostatic capacitance was 0.4 F/g, and the electrostatic capacitance per BET specific surface area was 1.03 $\mu F/cm^2$. The results are summarized in Table 1. At the time of cell production, it was difficult to penetrate the electrolytic solution into the electrode. For this reason, the electrode was once taken out, and then immersed in the electrolytic solution with another glass beaker. The electrode thus immersed was subjected to degassing for 30 minutes in a side box and then subjected to immersion treatment, thereby producing a cell again.

Comparative Example 1

A coconut shell was vacuum dried at 110° C. for 24 hours, and was then subjected to carbonization treatment under the conditions of a nitrogen flow rate of 1 L/min, a heating rate of 10° C./min, a maximum temperature of 550° C., and a holding time of 3 hours. The carbonized material was left to cool by itself. Next, the cooled material was heated at a nitrogen flow rate of 1 L/min, heating rate of 10° C./min, and maximum temperature of 900° C. As an activation treatment, a nitrogen containing water vapor allows to pass through the material for 30 minutes. Thereafter, the material was left to cool by itself. The porous carbon material in a particulate form thus obtained was not even in the shape and size of the pores within the cross-section. Although a calculation for structural-period determination was attempted, the scattered-light-intensity distribution curve thus obtained had no peak, showing that the porous carbon material was poor in structural evenness. The BET specific surface area was 1050 m$^2$/g, the average diameter of the pore by the MP method was 1.2 nm, the average diameter of the pore by the BJH method was 2.2 nm, and the pore volume by the MP method was 1.9 cm$^3$/g.

The electrode production and the charging/discharging test were carried out in the same manner as in Example 1. As a result, the electrode density was 0.42 g/cm$^3$, the electrostatic capacitance was 3.8 F/g, and the electrostatic capacitance per BET specific surface area was 0.36 μF/cm$^2$. The results are summarized in Table 1.

Comparative Example 2

A porous carbon material was obtained in the same manner as in Comparative Example 1 except that in the activation treatment, the passage time of the nitrogen containing water vapor was set to 1 hour. The porous carbon material in a particulate form thus obtained was not even in the shape and size of the pores within the cross-section. Although a calculation for structural-period determination was attempted, the scattered-light-intensity distribution curve thus obtained had no peak, showing that the porous carbon material was poor in structural evenness. The BET specific surface area was 1490 m$^2$/g, the average diameter of the pore by the MP method was 1.0 nm, the average diameter of the pore by the BJH method was 2.1 nm, and the pore volume by the MP method was 1.4 cm$^3$/g.

The electrode production and the charging/discharging test were carried out in the same manner as in Example 1. As a result, the electrode density was 0.41 g/cm$^3$, the electrostatic capacitance was 7.5 F/g, and the electrostatic capacitance per BET specific surface area was 0.50 μF/cm$^2$. The results are summarized in Table 1.

TABLE 1

| | | Continuous void structure | | | BET Specific surface area (m$^2$/g) | Pore | | | | | Performance of electric double layer capacitor | |
|---|---|---|---|---|---|---|---|---|---|---|---|---|
| | Starting material | Presence/ Absence | Structural period (nm) | Average porosity (%) | | Presence/ Absence | Average diameter (MP method) (nm) | Average diameter (BJH method) (nm) | Volume (MP method) (g/cm$^3$) | Electrode density (g/cm$^3$) | Electro static capacitance (F/g) | Electro static capacitance per BET Specific surfaces area (μF/cm$^2$) |
| Example 1 | polyacrylo nitrile | Presence | 73 | 45 | 2380 | Presence | 0.6 | 3.3 | 1.9 | 0.43 | 20.2 | 0.85 |
| Example 2 | polyacrylo nitrile | Presence | 73 | 45 | 39 | Absence | — | 12.1 | — | 0.68 | 0.4 | 1.03 |
| Example 3 | Phenol resin | Presence | 91 | 42 | 1231 | Presence | 0.4 | 20.1 | 1.2 | 0.46 | 8.1 | 0.66 |
| Comparative Example 1 | Coconut shell | Absence | — | — | 1050 | Presence | 1.2 | 2.2 | 1.9 | 0.42 | 3.8 | 0.36 |
| Comparative Example 2 | Coconut shell | Absence | — | — | 1490 | Presence | 1.0 | 2.1 | 1.4 | 0.41 | 7.5 | 0.50 |

The invention claimed is:

1. An electrode material for an electrochemical capacitor comprising a porous carbon material having a co-continuous structural portion wherein a carbon skeleton and voids form respective continuous structures, the co-continuous structural portion having a structural period of 0.002 μm to 20 μm.

2. The electrode material for an electrochemical capacitor according to claim 1, wherein a half-width of a peak of a scattered light intensity obtained by irradiating with X-rays is 5° or less.

3. The electrode material for an electrochemical capacitor according to claim 1, wherein the carbon skeleton in the porous carbon material is derived from polyacrylonitrile.

4. The electrode material for an electrochemical capacitor according to claim 1, having a particulate form.

5. The electrode material for an electrochemical capacitor according to claim 1, having a fiber form.

6. The electrode material for an electrochemical capacitor according to claim 1, wherein the average porosity of the co-continuous structural portion is in the range of 10 to 80%.

7. The electrode material for an electrochemical capacitor according to claim 1, comprising pores having an average diameter of 0.01 to 10 nm on a surface thereof.

8. The electrode material for an electrochemical capacitor according to claim 7, wherein the pores are formed on the surface of the carbon skeleton in at least the co-continuous structural portion.

9. The electrode material for an electrochemical capacitor according to claim 1, having a BET specific surface area of not less than 20 m$^2$/g.

10. The electrode material for an electrochemical capacitor according to claim 1, wherein the porous carbon material has a pore volume measured by BJH or NIP method of not less than 0.1 cm$^3$/g.

11. The electrode material for an electrochemical capacitor according to claim 1, wherein the porous carbon material further has a portion having substantially no co-continuous structure.

12. An electrode coating solution for an electrochemical capacitor comprising an electrode material for an electrochemical capacitor according to claim 1 and a binder.

13. An electrode for an electrochemical capacitor comprising an electrode material for an electrochemical capacitor according to claim 1.

14. The electrode for an electrochemical capacitor according to claim 13, having an electrode density of 0.3 to 1.0 g/cm$^3$.

15. An electrochemical capacitor comprising an electrode for an electrochemical capacitor according to claim 13.

* * * * *